Figure 1:
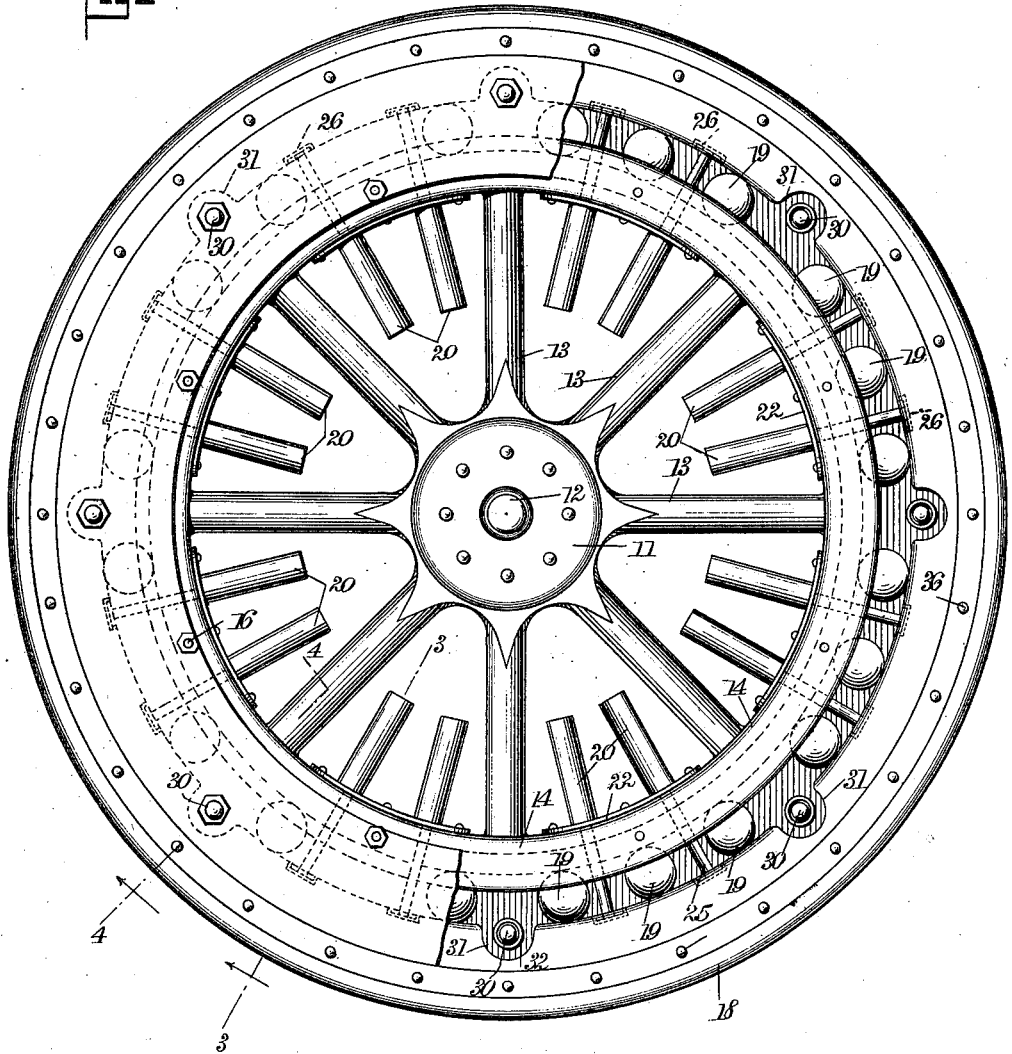

W. W. REVELL.
VEHICLE WHEEL.
APPLICATION FILED MAY 6, 1911.

1,029,633.

Patented June 18, 1912.

2 SHEETS—SHEET 1.

WITNESSES

INVENTOR
William W. Revell
BY
ATTORNEYS

W. W. REVELL.
VEHICLE WHEEL.
APPLICATION FILED MAY 6, 1911.
1,029,633.
Patented June 18, 1912.
2 SHEETS—SHEET 2.
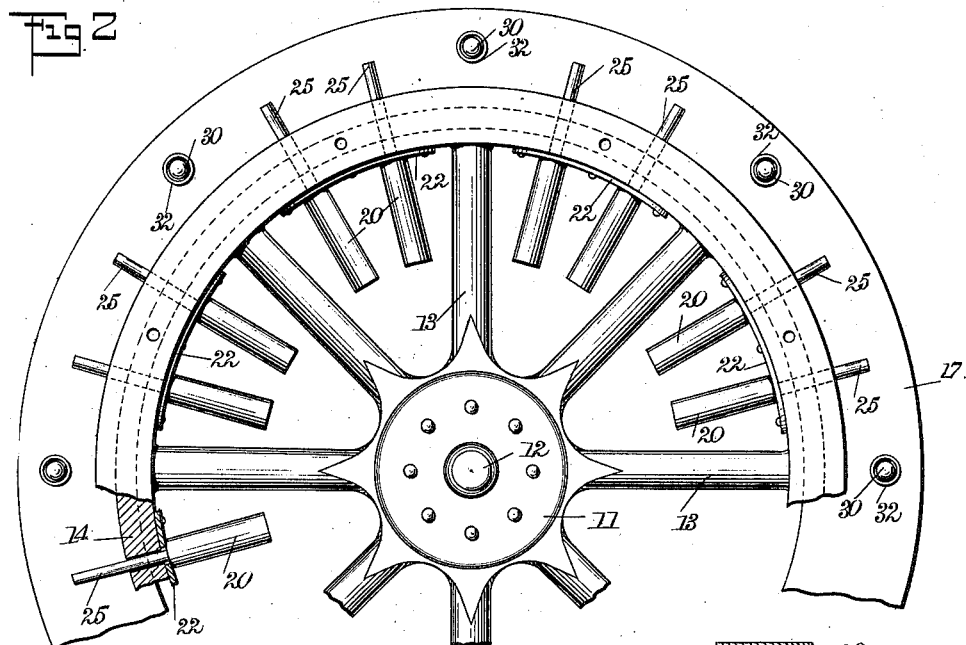
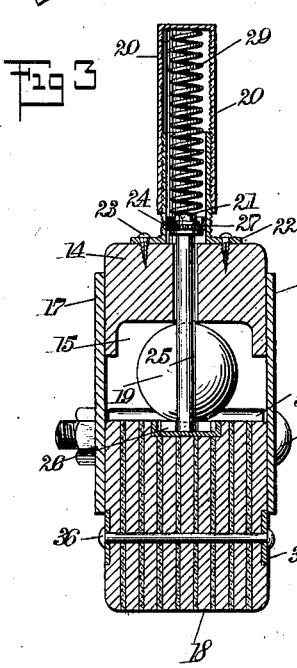
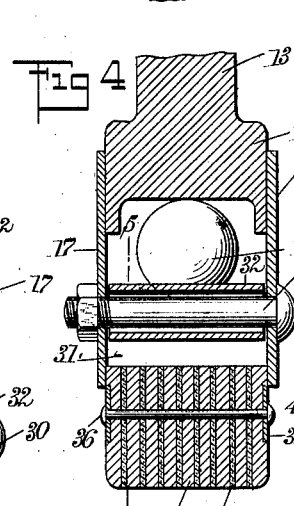
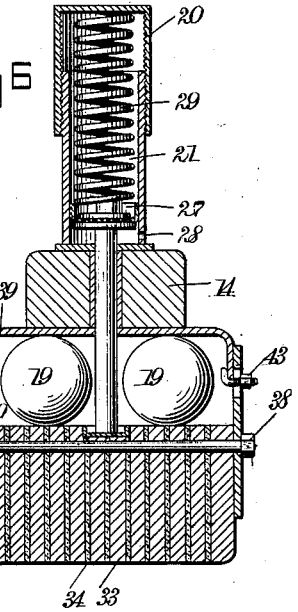
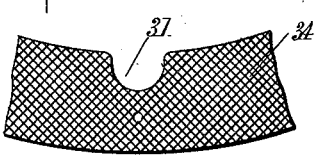
WITNESSES
INVENTOR
William W. Revell
BY
ATTORNEYS

UNITED STATES PATENT OFFICE.

WILLIAM W. REVELL, OF WALDEN, NEW YORK.

VEHICLE-WHEEL.

1,029,633.

Specification of Letters Patent.  Patented June 18, 1912.

Application filed May 6, 1911. Serial No. 625,495.

*To all whom it may concern:*

Be it known that I, WILLIAM W. REVELL, a citizen of the United States, and a resident of Walden, in the county of Orange and State of New York, have invented a new and Improved Vehicle-Wheel, of which the following is a full, clear, and exact description.

One of the principal objects of the present invention is to construct a wheel of the character named having a rigid tire and center structure supported by interposed resilient members.

A further object is to employ the resilient members constructed and arranged in unit form to avoid complete deflation of the cushion element.

A further object is to connect the tire and body portion of the wheel in such manner as to permit a certain degree of independent action of the tire and body portion and to correctively limit the same.

A further object is to produce a tire the construction whereof prevents the skidding incident to wheels of present construction.

With these objects in view the invention consists in providing a tire constructed from relatively thin strips of a non-resilient material having disposed therein rings constructed of suitable wire fabric.

It further consists in providing a tire and body structure united by side guide plates and held concentric by small independent pneumatic cushion devices.

One embodiment of the present invention is disclosed in the structure illustrated in the accompanying drawings, in which like characters of reference denote corresponding parts in all the views, and in which—

Figure 1 is a side view of a vehicle wheel constructed and arranged in accordance with the present invention; Fig. 2 is a side view of a fragment of the wheel constructed in accordance with the present invention, the tire, pneumatic cushions and one of the side plates being removed; Fig. 3 is a detail view, on an enlarged scale, of a cross section taken on the line 3—3 in Fig. 1; Fig. 4 is a detail view, on an enlarged scale, of a cross section taken on the line 4—4 in Fig. 1; Fig. 5 is a detail view in section, taken on the line 5—5 in Fig. 4; and Fig. 6 is a detail view, on an enlarged scale, showing in section a modified form of mounting for a tire having a wider tread and the resilient cushions therefor.

As shown in the accompanying drawings, the inner structure of the wheel is rigid, having a hub 11 of usual construction. The hub 11 is provided with the usual cap nut 12 to close the bearing aperture to the axle. Radiating from the hub are short spokes 13. The spokes 13 are suitably connected to a wood rim 14. In the present construction it is preferred to groove the rim 14 at the outer periphery to form a channel 15. Rigidly secured to the said rim by suitable fastening devices, such as the bolts 16, are side plates 17. The plates 17 form retaining devices and guides for the operation of the tire 18. The tire 18 moves freely between the inner surfaces of the plates 17, and is held concentric with the center of the hub 11 by means of the rubber balls 19. The balls 19 may be either hollow to operate as pneumatic cushions, or solid, if a more rigid wheel be desired.

As shown in the drawings, the balls 19 are employed as supplemental to the pneumatic cylinders 20. The cylinders 20 are internally threaded to register with external threads formed on short tubes 21. The tubes 21 are provided with base plates 22 for mounting upon the rim 14, said plates being provided with perforations to receive the fastening devices 23 which in the present instance are shown as ordinary wood screws. The joints formed between the cylinders 20 and the tubes 21 are sufficiently close to prevent the exit of air from the cylinders when the pistons 24 are suddenly and violently extended within the said cylinders, which action transpires when the weight of the body of the vehicle is exerted downward upon the tire 18 below any number of cylinders 20.

Each of the pistons 24 is provided with a suitable plunger rod 25, the end whereof normally rests in a metal cup 26. The cup 26 is sufficiently deep to not imprison or hold in definite position the end of the plunger rod 25. To trap the air in the cylinder 20 the piston 24 is faced or otherwise provided with a leather packing disk 27. The disk 27 is slightly enlarged in diameter to cup upwardly, as shown best in Figs. 3 and 6. This construction provides for the voidance of the air admitted to the tube 21 through the perforation 28 at the lower end thereof. While the flap of the disk 27 yields readily to admit air above the piston 24 the pressure from above operates to stretch the said flap the more tightly against the side of the tube to prevent the passage of air about the piston. In this manner each of the cylinders 20 becomes a pneumatic cushion to carry the weight imposed upon the tire and the rigid body of the wheel through the axle of the vehicle.

As seen in Fig. 1 of the drawings the arrangement of the cylinders 20 is such that the movement of the tire toward the center of the hub of the completed wheel forces within the cylinders each of the plunger rods 25 disposed below the horizontal median line of the wheel. This action results in the gradual inward forcing of each of the said plunger rods as the same passes the said horizontal median line at the forward edge of the wheel, and permits the extension from the cylinder at the rearward edge of the wheel, the maximum insertion of the rods being at the point vertically below the axle of the vehicle. Disposed within each cylinder 20 is a spiral spring 29 which rests against the upper end of the said cylinder 20 and against the head of the piston 24. The function of the said springs is to force outward the pistons 24, rods 25 and the tire 18. The cylinders 20 may be manipulated to diminish the holding capacity thereof by screwing the same upon the tubes 21. This operation results in a two-fold effect, to stiffen the action of the pneumatic cushion formed by the cylinder and to increase the tension of the springs 29. The tire 18 is prevented from creeping circumferentially on the wheel structure by the bolts 30 and recesses 31 formed adjacent the inner periphery of the tire. The bolts 30 extend through the plates 17 and are provided with short tube sections 32 which operate as rollers when in contact with the sides of the recesses 31.

When in the operation of the wheel as a driver the pull on the tire thereof is exerted from the plates 17 through the bolts 30 and tube sections 32 against the side of the recesses 31. As the cushions yield under the weight of the vehicle and the tire and rim are moved toward each other, the tube sections 32 roll down the inclined side of the recesses 31 to which they are connected to take up any circumferential displacement between the tire and body of the wheel.

As shown in the drawings, the tire is composed of a series of ring sections 33. The ring sections 33 are constructed preferably of wood. Interposed between each of the ring sections 33 are rings 34 formed of suitable wire cloth. The rings 34 are united, the interspaces being filled with any suitable material, such as any good waterproof cement, which would prevent the passage between the rings 33 and 34 of water which might become absorbed by the sections 33 at the sides thereof. The rings thus assembled are held in shape by the side ring plates 35 which are perforated to receive the rivets 36.

The tire, as shown in the drawings, is completely constructed, and as a single element of the wheel, prior to the connection to the body. It will be understood that the tire wears and is replaced. Further, that the same is subject to accident which would necessarily require repair. For this purpose the present wheel is so constructed that by removing one of the plates 17, as shown in Fig. 2 of the drawings, the tire may be readily and easily removed from the rest of the wheel structure. This ready removal of the tire permits the repair or replacement thereof on the wheel.

In Fig. 6 of the drawings is shown a modified form of the invention, the modification consisting in dispensing with the plates 35 and in lieu thereof bolting the side plates 37 directly upon the tire to compress the rings 33 and 34, using for this purpose the bolts 38. The plates 37 are thus held rigidly to the tire instead of being secured rigidly to the rim 14, as in the construction shown in the preceding drawings. In the present instance the rim 14 is provided with an extension channel member 39, the outer edges whereof are engaged by the hooks 40 formed in the ends of short bolts 41 which are extended through slots 42 formed in the side of the plates 37. The bolts 41 are suitably threaded to register with the threads in the nuts 43.

The modified construction above described is particularly adapted for employment in wheels requiring wide or heavy tires. In this case, also, it will be observed that there is provided a double row of balls 19, these being disposed transversely the opposite sides of the plunger rod 25.

Having thus described my invention, what I claim as new and desire to secure by Letters Patent is :—

In a vehicle wheel having a rigid body portion and a rigid tire loosely connected therewith, a pneumatic cushion member having a cylinder the length whereof is variable; a piston mounted in said cylinder and having an intake valve; a plunger connected with said piston to bear against the inner surface of said tire; a spiral spring mounted in said cylinder to normally force outward therefrom the said piston and plunger; a cup to receive the end of said plunger said cup being suitably mounted on said tire; and an air supply duct for said cylinder opening into the lower end thereof.

In testimony whereof I have signed my name to this specification in the presence of two subscribing witnesses.

WILLIAM W. REVELL.

Witnesses:
MARCUS L. BIRCH,
DAVID GOETLINS.